United States Patent
Yamaoka et al.

(10) Patent No.: US 6,881,693 B2
(45) Date of Patent: Apr. 19, 2005

(54) ZIRCONIA-CONTAINING INORGANIC FIBER AND PROCESS FOR THE PRODUCTION THEREOF

(75) Inventors: Hiroyuki Yamaoka, Ube (JP); Yoshikatsu Harada, Ube (JP); Hidekuni Hayashi, Ube (JP)

(73) Assignee: Ube Industries, Ltd., Yamaguchi-ken (JP)

( * ) Notice: Subject to any disclaimer, the term of this patent is extended or adjusted under 35 U.S.C. 154(b) by 0 days.

(21) Appl. No.: 10/297,299

(22) PCT Filed: Apr. 3, 2002

(86) PCT No.: PCT/JP02/03328

§ 371 (c)(1),
(2), (4) Date: Dec. 4, 2002

(87) PCT Pub. No.: WO02/081795

PCT Pub. Date: Oct. 17, 2002

(65) Prior Publication Data

US 2003/0134121 A1 Jul. 17, 2003

(30) Foreign Application Priority Data

Apr. 5, 2001 (JP) ........................................ 2001-106634
Jun. 4, 2001 (JP) ........................................ 2001-167679

(51) Int. Cl.$^7$ ........................ C04B 35/48; C04B 35/565
(52) U.S. Cl. ........................ 501/95.1; 501/88; 501/103; 264/625; 264/627; 264/640; 502/178; 502/242; 502/349

(58) Field of Search ........................ 501/88, 95.1, 103; 264/640, 627, 625; 502/178, 242, 349

(56) References Cited

U.S. PATENT DOCUMENTS

| | | | |
|---|---|---|---|
| 4,515,742 A | | 5/1985 | Yajima et al. ............... 264/627 |
| 4,663,229 A | * | 5/1987 | Yajima et al. ............... 428/364 |
| 4,770,935 A | * | 9/1988 | Yamamura et al. .......... 428/366 |
| 5,292,830 A | | 3/1994 | Funayama et al. ........... 525/478 |
| 6,541,416 B1 | * | 4/2003 | Ishikawa et al. ............. 502/240 |
| 6,582,650 B1 | * | 6/2003 | Kumagawa et al. ......... 264/603 |

FOREIGN PATENT DOCUMENTS

| JP | 60-185817 | 9/1985 |
|---|---|---|
| JP | 62-289614 | 12/1987 |

* cited by examiner

*Primary Examiner*—Karl Group
(74) *Attorney, Agent, or Firm*—Wenderoth, Lind & Ponack, LLP (57) ABSTRACT

There are provided a high-strength zirconia-containing inorganic fiber having excellent alkali resistance, oxidation resistance, catalyst function and/or catalyst-carrying function and a process for the production thereof. The zirconia-containing inorganic fiber is a fiber which is formed of a composite oxide phase comprising a first phase mainly formed of a silica component or silicon carbide and a second phase formed of zirconia, and it is characterized in that the ratio of Zr slopingly increases toward the surface layer of the fiber.

8 Claims, 7 Drawing Sheets

AES DEPTH PROFILE OF $ZrO_2$-SiC FIBER

ZIRCONIA-CONTAINING INORGANIC FIBER AND PROCESS FOR THE PRODUCTION THEREOF

TECHNICAL FIELD

The present invention relates to a high-strength zirconia-containing inorganic fiber having excellent alkali resistance, oxidation resistance, catalyst function and/or catalyst-carrying function and a process for the production thereof. Specifically, it relates to a fiber which is composed of a central portion (silica phase or silicon carbide phase) taking charge of dynamic properties and a zirconia phase taking charge of various functions in a surface layer and near the surface layer and has a slope constitution toward the surface layer, and a process for the production thereof.

TECHNICAL BACKGROUND

In recent years, a catalyst or a filter for cleaning toxic substances has come to be requested with an enhancement of a concern to environmental preservation.

Nitrogen oxides generated from internal combustion engines such as an automobile engine or industrial plants are air pollutants harmful to a human organism or the environment, so that it is required to decrease nitrogen oxides. As a method for removing nitrogen oxides, there have been practically used a three way catalyst method for a gasoline engine and a selective catalytic reduction method using ammonia for industrial plants or the like.

Further, recently, a dark smoke particulate matter (PM) discharged from a diesel engine is particularly receiving attention as a substance that causes serious harm to a human organism. As a material which collects PM, a filter produced from a silicon-carbide-based fiber has been put to practical use. Further, there are carried out attempts to decrease PM combustion or nitrogen oxides by making a catalyst component be carried on a silicon-carbide-based fiber surface.

However, these environmental cleaning techniques have a variety of problems with regard to practical uses of these techniques. Concerning the cleaning of nitrogen oxides, when high-concentration oxygen is contained like a diesel engine exhaust gas, it is difficult to adopt the three way catalyst method since an oxidation reaction of a reducing agent (CO or hydrocarbon) preferentially occurs. Further, when the selective catalytic reduction method using ammonia is adopted, it is required to handle an ammonia gas having high toxicity and corrosivity. Concerning the PM, a current filter made of a silicon-carbide-based fiber has high collection effect, while it is impossible to remove PM combustion unless a catalyst component is carried on the fiber. Further, it does not have function of cleaning nitrogen oxides discharged together with PM.

Further, a silicon-carbide-based fiber is generally poor in alkali resistance so that a very small quantity of alkali metal or alkali earth metal contained in an exhaust gas causes corrosion. Further, when alkali metal or alkali earth metal as a catalyst component is carried on the fiber, a deterioration of the fiber due to corrosion becomes very remarkable.

It is estimated that the above corrosion deterioration can be improved by using a zirconia fiber excellent in alkali resistance in place of the silicon-carbide-based fiber. However, a current zirconia fiber is synthesized mainly according to a sol-gel method, as described in, for example, New Ceramic No. 8, pages 53 to 58, (1996). Its tensile strength is very low or 1 Gpa or lower and it is insufficient in practical strength.

Furthermore, for making a catalyst be carried on a fiber, it is preferred that the fiber has a larger specific surface area. However, the specific surface area of the current zirconia fiber is low or 10 $m^2/g$ or less.

DISCLOSURE OF THE INVENTION

According to the present invention, there are provided a high-strength zirconia-containing inorganic fiber having excellent alkali resistance, oxidation resistance, catalyst function and/or catalyst-carrying function and a process for the production thereof. The zirconia-containing inorganic fiber of the present invention is composed of a central portion (silica phase or silicon carbide phase) taking charge of dynamic properties and a zirconia phase taking charge of various functions in a surface layer and near the surface layer and has a fiber structure having a slope constitution toward the surface layer.

That is, the present invention is directed to a zirconia-containing inorganic fiber which comprises a composite oxide phase composed of a first phase mainly formed of a silica component or silicon carbide and a second phase formed of zirconia and is characterized in that the ratio of Zr slopingly increases toward the surface layer of the fiber and a process for the production thereof.

PREFERRED EMBODIMENTS FOR WORKING THE INVENTION

In the zirconia-containing inorganic fiber, the first phase mainly formed of a silica component or silicon carbide may be amorphous or crystalline. Further, it may contain a metal element or a metal oxide which can form a solid solution or a eutectic compound with silica. Although a metal element (A) which can form a solid solution with silica or a metal element (B) whose oxide can form a compound having a specific constitution with silica is not specially limited, for example, the metal element (A) includes titanium and the metal element (B) includes aluminum, zirconium, yttrium, lithium, sodium, barium, calcium, boron, zinc, nickel, manganese, magnesium and iron.

The first phase mainly formed of a silica component or silicon carbide forms an inside phase of the fiber provided by the present invention and it plays an important role in taking charge of dynamic properties. The ratio of the first phase based on the fiber as a whole is preferably 98 to 40% by weight. It is preferred to control the ratio of the first phase in the range of from 50 to 95% by weight for exerting intended functions of the second phase sufficiently and exerting high dynamic properties concurrently.

On the other hand, zirconia which constitutes the second phase plays an important role in exerting the intended function in the present invention. It may be amorphous or crystalline. It may be a solid solution in which calcium, yttrium or the like is dissolved. The ratio of the second phase which constitutes a surface layer portion of the fiber is preferably 2 to 60% by weight. It is preferred to control the ratio of the second phase in the range of from 5 to 50% by weight for exerting its functions sufficiently and exerting high strength concurrently. The ratio of Zr which constitutes the second phase slopingly increases towards the fiber surface. The thickness of a region where the slope of the constitution is apparently recognized is preferably controlled in the range of 5 to 500 nm. In some cases, the thickness of the above region may reach to approximately ⅓ of the diameter of the fiber. In the present invention, further, each of the "ratios" of the first phase and the second phase independently refers to "% by weight" of a component which constitutes the first phase or a component which constitutes the second phase based on the whole components of the first phase and the second phase, i.e., based on the whole fiber.

The zirconia-containing inorganic fiber of the present invention preferably has a BET specific surface area of 1 m²/g or more, more preferably 5 m²/g or more. That the specific surface area is large is advantageous for increasing the catalyst-carrying function.

The zirconia-containing inorganic fiber of the present invention is preferably used in the form of a woven fabric or a nonwoven fabric. A properly-selected catalyst component may be carried on the surface of the inorganic fiber. A weaving form for the woven fabric is not specially limited. It can be selected from various known weaving forms such as a plain weave, a satin weave, a twill weave, a mock leno weave, a leno weave, a hollow weave and a felt weave, as required. The basis weight of the woven fabric is preferably approximately 10 to 500 m²/g. When the zirconia-containing inorganic fiber of the present invention is used as a filter, the form thereof can be selected from various forms such as a plane form, a cylindrical form, an envelope form and a conical form as required. Further, in the present invention, other inorganic fibers such as a glass fiber, a carbon fiber and an alumina fiber, may be used in proper amounts as a fiber which constitutes the filter.

Next, a process for the production of the zirconia-containing inorganic fiber obtained by the present invention will be explained.

In the present invention, a modified polycarbosilane obtainable by modifying a polycarbosilane which has a main chain structure represented by the formula, (in which R is a hydrogen atom, a lower alkyl group or a phenyl group) and a number average molecular weight of 200 to 10,000, with an organic zirconium compound having a basic structure of the formula $Zr(OR')n$ or the formula $ZrR''m$ (in which R' is an alkyl group having 1 to 20 carbon atoms or a phenyl group, R'' is acetylacetonate, and each of m and n is an integer of more than 1), is melt-spun or a mixture of the modified polycarbosilane and an organic zirconium compound is melt-spun, to obtain a spun fiber; the spun fiber is infusibilized; and then the infusible fiber is calcined in an oxidizing atmosphere or an inert atmosphere, whereby the zirconia-containing inorganic fiber can be produced. In the above production, when the oxidizing atmosphere is adopted as a calcination atmosphere, the first phase becomes an oxide phase formed of silica as a main component. When the inert atmosphere is adopted, the first phase becomes a silicon carbide phase.

The first step of the present invention's process is a step of producing a modified polycarbosilane having a number average molecular weight of 1,000 to 50,000 as a starting material used for producing the zirconia-containing inorganic fiber. The fundamental production process of the above modified polycarbosilane is remarkably similar to the production process of JP-A-56-74126. However, in the present invention, it is required to carefully control the bonding state of a functional group described in JP-A-56-74126. The general outlines thereof will be explained hereinafter.

The modified polycarbosilane as a starting material is derived mainly from a polycarbosilane having a main chain structure represented by the formula, (in which R is a hydrogen atom, a lower alkyl group or a phenyl group) and a number average molecular weight of 200 to 10,000 and an organic zirconium compound having a basic structure of an organic zirconium compound having a basic structure of the formula $Zr(OR')n$ or the formula $ZrR''m$ (in which R' is an alkyl group having 1 to 20 carbon atoms or a phenyl group, R'' is acetylacetonate, and each of m and n is an integer of more than 1).

For producing the fiber having a slope constitution, provided by the present invention, it is required to select slow reaction conditions under which only part of the organic zirconium compound forms a bond with the polycarbosilane. For the above purpose, it is required to carry out the reaction at a temperature of 280° C. or lower, preferably 250° C. or lower, in an inert gas. Under the above reaction conditions, even when the above organic zirconium compound is reacted with the polycarbosilane, it bonds as a monofunctional polymer (i.e., a pendant-like bonding) and no large increase in molecular weight occurs. The thus-obtained modified polycarbosilane in which the organic zirconium compound is partially bonded plays an important role in improving compatibility between the polycarbosilane and the organic zirconium compound.

When two or more functional groups are bonded, the polycarbosilane forms a cross-linking structure and a noticeable increase in molecular weight is observed. In this case, sudden heat generation and an increase in melt viscosity occur in the reaction. On the other hand, when only one functional group is reacted as described above and an unreacted organic zirconium compound remains, conversely, a decrease in melt viscosity is observed.

In the present invention, it is preferred to select conditions under which an unreacted organic zirconium compound is intentionally left. The present invention uses mainly, as a starting material, a material in which the above modified polycarbosilane coexists with an organic zirconium compound which is in an unreacted state or an organic zirconium compound which is dimer, trimer or so. However, the modified polycarbosilane alone can be similarly used as a starting material when the modified polycarbosilane contains a modified polycarbosilane component having an extremely low molecular weight.

In the second step of the present invention's process, the modified polycarbosilane obtained in the first step or a mixture of the modified polycarbosilane and a low molecular-weight organic zirconium compound is molten to form a spinning solution, optionally the spinning solution is filtered to remove substances which are to be detriment at the time of spinning such as a microgel or impurities, and the spinning solution is spun with a generally used synthetic fiber-spinning machine. While the temperature of the spinning solution at the spinning time differs depending upon the softening temperature of the modified polycarbosilane as raw materials, it is advantageous to select a temperature in the range of from 50 to 200° C. The above spinning machine may be provided with a humidifying and heating cylinder in a nozzle bottom portion as required. The diameter of a fiber is adjusted by changing the amount of ejection from a nozzle and the take-up speed of a high-speed take-up unit attached to a bottom portion of the spinning machine.

In addition to the above-described melt spinning, the second step of the present invention's process can give an intended fiber by dissolving the modified polycarbosilane obtained in the first step or a mixture of the modified polycarbosilane and low molecular-weight organic zirconium compound in a solvent which can dissolve the modified polycarbosilane and the low molecular-weight organic zirconium compound, to form a spinning solution, optionally filtering the spinning solution to remove substances which are to be detriment at the time of spinning such as a microgel or impurities, and spinning the spinning solution with a generally used synthetic fiber-spinning machine by a dry spinning method while controlling the take-up speed. The solvent which can dissolve the modified polycarbosilane and the low molecular-weight organic zirconium compound includes benzene, toluene, xylene and the like.

In these spinning steps, a spinning cylinder may be attached to the spinning machine as required. An atmosphere in the cylinder is replaced with a mix atmosphere mixed with at least one gas selected from the above solvents or replaced with an atmosphere of air, an inert gas, heated air, a heated inert gas, steam, an ammonia gas, a hydrocarbon gas or an organosilicon compound gas, whereby solidification of the fiber in the spinning cylinder can be controlled.

Next, in the third step of the present invention's process, the above spun fiber is preliminarily heated in an oxidizing atmosphere under the action of tension or no tension, to infusibilize the spun fiber. The purpose of this step is to prevent the fiber from melting in the following calcination step and to prevent adjacent fibers from bonding to each other. The temperature for the treatment and the time for the treatment differ depending upon constitution. Although not specially limited, generally, the treatment is carried out in the range of 50 to 400° C. for several hours to 30 hours. The above oxidizing atmosphere may contain moisture, nitrogen oxide, ozone, etc., which increase the oxidation strength of the spun fiber, and an oxygen partial pressure may be changed intentionally.

In some cases, the softening temperature of the spun fiber becomes less than 50° C. according to the ratio of substances having a low molecular weight in raw materials. In these cases, a treatment for promoting the oxidation of a fiber surface is previously carried out at a temperature lower than the above treatment temperature in some cases. In the third step and the second step, there is advanced a bleedout of the low-molecular weight compound, contained in the raw material, to the fiber surface. It is considered that the ground of an intended slope constitution is accordingly formed.

In the next fourth step of the present invention's process, the above infusible fiber is calcined under tension or no tension at a temperature in the range of 500 to 1,800° C. in an oxidizing atmosphere, to obtain an intended zirconia-containing inorganic fiber formed of a composite oxide phase composed of an oxide phase (first phase) mainly formed of a silica component and a zirconia phase (second phase), in which the ratio of Zr slopingly increases towards the surface layer.

Further, in this fourth step, the calcination can be carried out in an inert atmosphere. The above infusible fiber is calcined under tension or no tension at a temperature in the range of 500 to 2,000° C. in an inert atmosphere, to obtain an intended zirconia-containing inorganic fiber formed of a composite oxide phase composed of a silicon carbide phase (first phase) and a zirconia phase (second phase), in which the ratio of Zr slopingly increases towards the surface layer.

Figure 1:
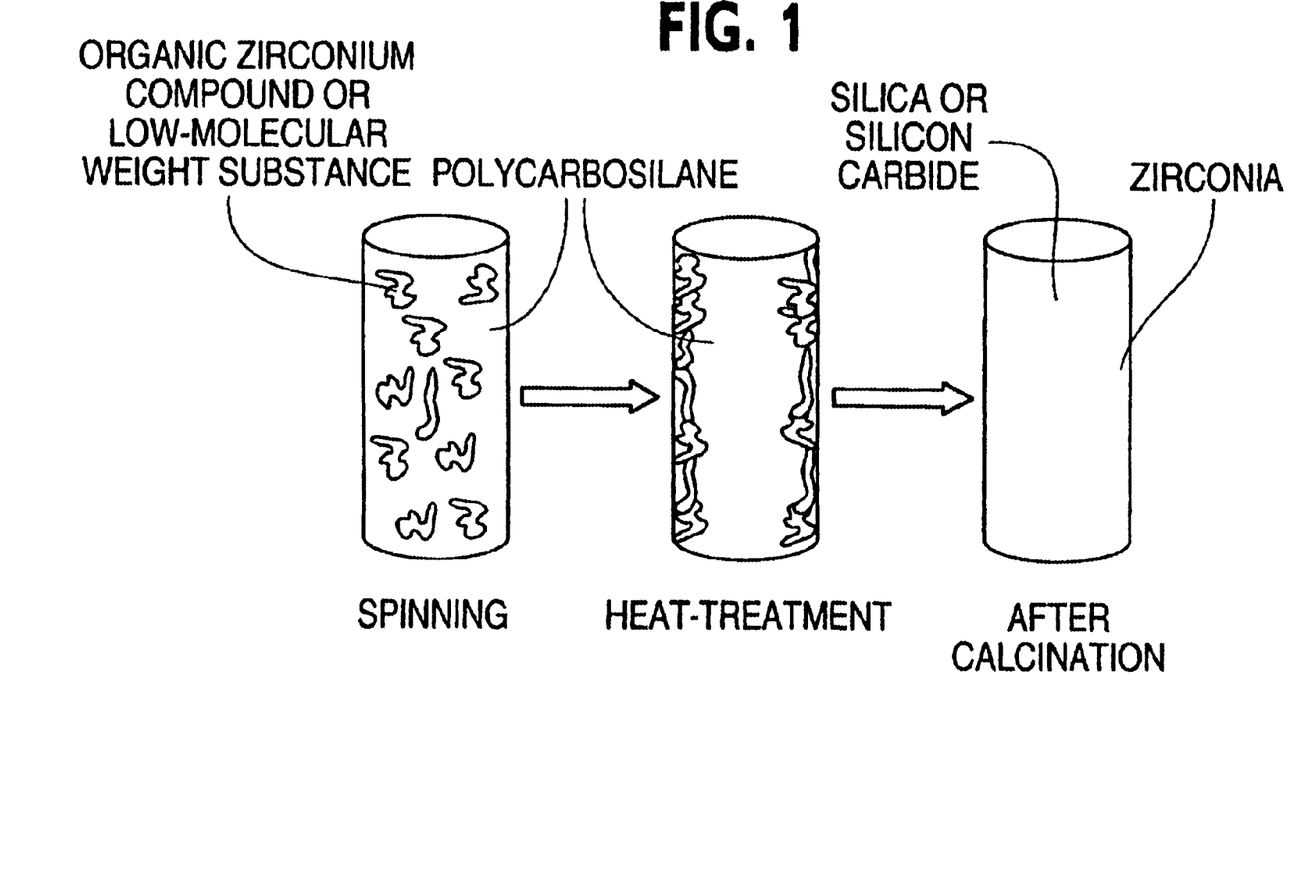
FIG. 1 is a drawing showing stepwise generation stages of a zirconia-containing inorganic fiber having a slope constitution.

FIG. 1 schematically shows steps of the generation of the zirconia-containing inorganic fiber having an intended slope constitution, provided by the present invention.

EXAMPLES

The present invention will be explained with reference to Examples hereinafter.

Referential Example 1

2.5 liters of anhydrous toluene and 400 g of metallic sodium were placed in a three-necked flask having a volume of 5 liters, the mixture was heated to the boiling point of toluene under a flow of nitrogen gas, and 1 liter of dimethyldichlorosilane was dropwise added over 1 hour. After the completion of the addition, the mixture was refluxed under heat for 10 hours to obtain a precipitate. The precipitate was recovered by filtration, and washed with methanol and then with water to give 420 g of a white powder polydimethylsilane.

250 g of the polydimethylsilane was placed in a three-necked flask equipped with a water-cooling refluxing device, and allowed to react under heat at 420° C. for 30 hours under a flow of nitrogen gas, to obtain a polycarbosilane having a number average molecular weight of 1,200.

Example 1

100 g of toluene and 64 g of tetrabutoxyzirconium were added to 16 g of the polycarbosilane synthesized according to Referential Example 1, the mixture was preliminarily heated at 100° C. for 1 hour, then, the mixture was slowly temperature-increased up to 150° C. to distill the toluene off, the resultant mixture was allowed to react at the above temperature for 5 hours, and then the reaction mixture was further temperature-increased up to 250° C. and allowed to react at this temperature for 5 hours, to obtain a modified polycarbosilane. 5 g of tetrabutoxyzirconium was added to the modified polycarbosilane for the purpose of intentionally making a low-molecular weight organic metal compound coexist, to obtain a mixture of the modified polycarbosilane and the low-molecular weight organic metal compound.

The mixture of the modified polycarbosilane and the low-molecular weight organic metal compound was dissolved in toluene, the resultant solution was placed in a spinning machine made of glass, it was temperature-increased in the spinning machine in which nitrogen had been sufficiently substituted to distill the toluene off and the resultant material was melt-spun at 180° C.

The spun fiber was stepwise heated up to 150° C. in air to form an infusible fiber, and the infusible fiber was calcined in air at 1,200° C. for 1 hour, to obtain a zirconia-containing inorganic fiber.

The obtained zirconia-containing fiber (average diameter: 10 $\mu$m) was analyzed with X-ray. As a result thereof, it was found that the fiber was formed of an amorphous silica and zirconia. The Zr/Si molar ratio of the fiber as a whole was 0.20. Further, the fiber was examined for the distribution state of constitutive atoms by EPMA. The molar ratio of Zr/Si was 0.85 in the region of from the outermost periphery portion to a depth of 1 $\mu$m, the molar ratio of Zr/Si was 0.18 in the region of from a depth of 3 $\mu$m to 4 $\mu$m below the outermost periphery, and the molar ratio of Zr/Si in the central portion was 0.05. Accordingly, it was confirmed that the fiber had a slope constitution in which zirconium increased towards the surface. The fiber had a tensile strength of 2.0 GPa. The above tensile strength of the fiber was remarkably higher than that of a zirconia fiber obtained by a conventional sol-gel method. The fiber had a specific surface area of 10 $m^2/g$. Further, the fiber was measured for the ratio of zirconia with a fully-automatic fluorescent X-ray analyser (PW2400) supplied by PHILIPS. The ratio of zirconia based on the fiber as a whole was 20% by weight.

The above zirconia-containing inorganic fiber was molded into a felt form with a needle-punch, to produce a cylindrical filter having a diameter of 200 mm and a height of 500 mm. A mixed gas of 100 ppm NO and 10% $O_2$ was flown together with 300 ppm of propane (reducing agent) at a flow rate of 10 liters/minute from the outside of the filter. At this time, an electric heater was installed at the inside surface of the filter and the temperature of the filter was maintained at 600° C. A gas which had been passed through the filter was sampled and the gas was measured for a NO concentration according to a chemiluminescence method. The NO concentration was 1 ppm or less.

Further, an exhaust gas from a diesel engine was passed through the above filter for 30 minutes at a flow rate of 15 liters/minute. 95% of dark smoke particulate matter (PM) in the exhaust gas was collected. The PM was oxidized and removed by heating the filter which collected the PM in an atmospheric air at 1,000° C. for 30 minutes, thereby recycling the filter. The recycled filter had no damage.

Example 2

The same filter as that produced in Example 1 was immersed in an aqueous solution containing potassium nitrate and cobalt nitrate and then the filter was calcined in air at 600° C., whereby a potassium salt-cobalt oxide catalyst as a PM removal catalyst was carried on the surface of the filter. An exhaust gas from a diesel engine was passed through the above filter, which was kept at 700° C., for 30 minutes at a flow rate of 15 liters/minute. At least 97% of dark smoke particulate matter (PM) in the exhaust gas was removed. The filter after the test was observed to find no deterioration such as corrosion.

Example 3

Figure 2:
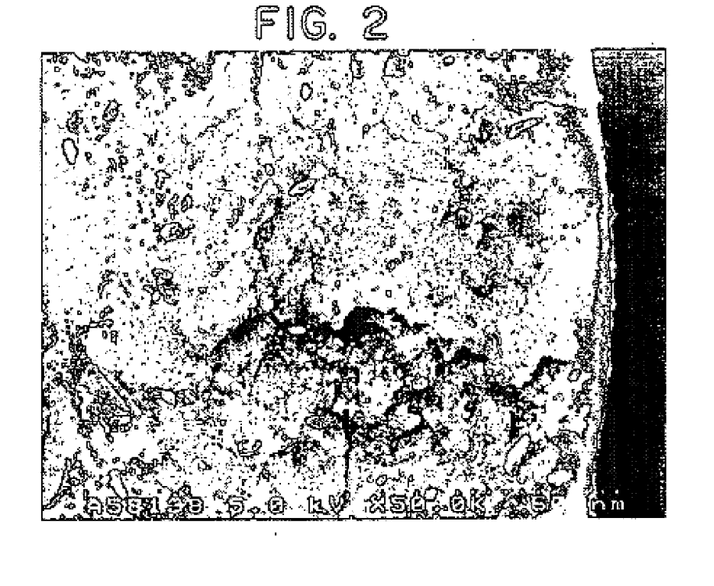
FIG. 2 is a cross-sectional photograph of the whole of a zirconia-containing inorganic fiber obtained in Example 3.
Figure 3:
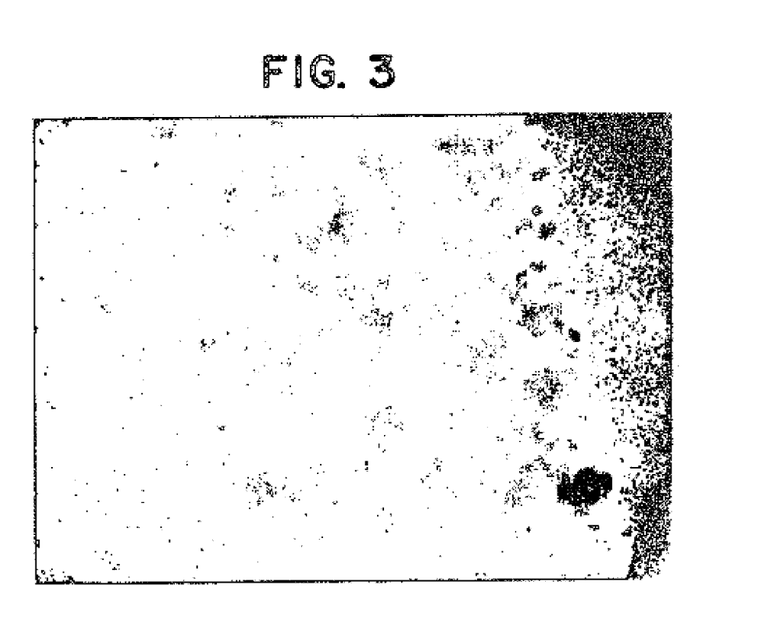
FIG. 3 is a cross-sectional photograph of a portion near the surface layer of a zirconia-containing inorganic fiber obtained in Example 3.

The same infusible fiber as that obtained in Example 1 was calcined in an argon gas at 1,400° C. for 1 hour, to obtain a zirconia-containing inorganic fiber. FIG. 2 and FIG. 3 show a cross-sectional photograph of the whole of the zirconia-containing inorganic fiber through an electron microscope and a cross-sectional photograph of a portion near its surface layer.

Figure 12:
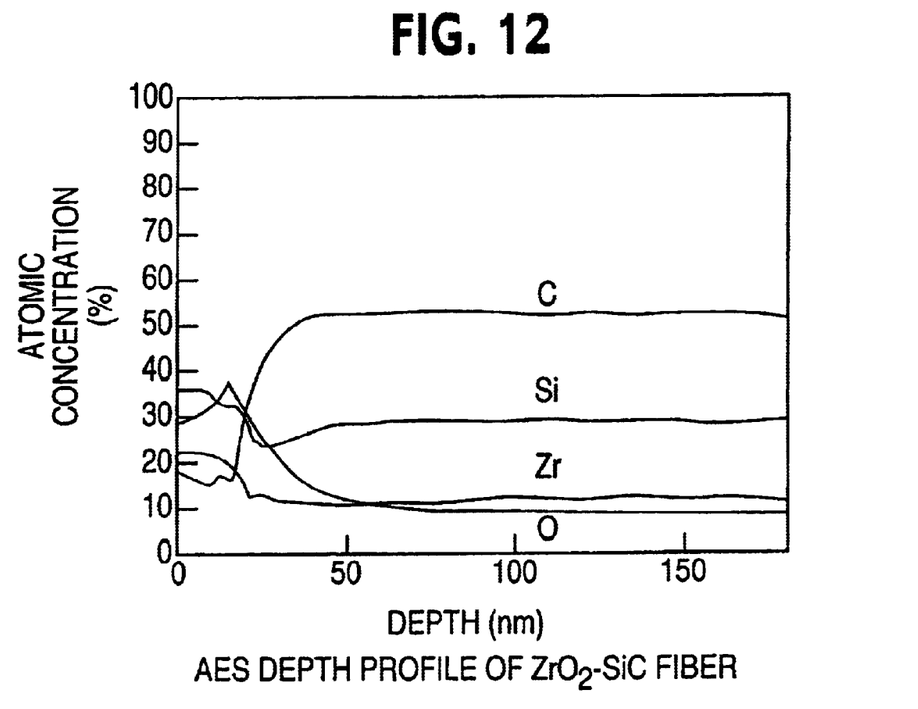
FIG. 12 is a graph showing the distribution of each element, such as zirconium, of a zirconia-containing inorganic fiber, obtained in Example 3, in a surface layer portion and in a region from the surface to a depth of approximately 150 nm.

The obtained zirconia-containing fiber (average diameter: 10 $\mu$m) was analyzed with X-ray. As a result thereof, it was found that the fiber was formed of an amorphous silicon carbide and zirconia. The Zr/Si molar ratio of the fiber as a whole was 0.20. Further, the fiber was examined for the distribution state of constitutive atoms by EPMA. The molar ratio of Zr/Si was 0.75 in the region of from the outermost periphery portion to a depth of 1 $\mu$m, the molar ratio of Zr/Si was 0.20 in the region of from a depth of 3 $\mu$m to 4 $\mu$m below the outermost periphery, and the molar ratio of Zr/Si in the central portion was 0.10. Accordingly, it was confirmed that the fiber had a slope constitution in which zirconium increased towards the surface. FIG. 12 shows the distribution of each element, such as zirconium, of the zirconia-containing inorganic fiber in a surface layer portion and in a region of from the surface to a depth of approximately 150 nm. The fiber had a tensile strength of 2.2 GPa. The above tensile strength of the fiber was remarkably higher than that of a zirconia fiber obtained by a conventional sol-gel method. The fiber had a specific surface area of 80 $m^2/g$. Further, the fiber was measured for the ratio of zirconia with a fully-automatic fluorescent X-ray analyser (PW2400) supplied by PHILIPS. The ratio of zirconia based on the fiber as a whole was 22% by weight.

The above zirconia-containing inorganic fiber was molded into a felt form with a needle-punch, to produce a cylindrical filter having a diameter of 200 mm and a height of 500 mm.

A mixed gas of 100 ppm NO and 10% $O_2$ was flown without a reducing agent at a flow rate of 10 liters/minute from the outside of the filter. At this time, an electric heater was installed at the inside surface of the filter and the temperature of the filter was maintained at 600° C. A gas which had been passed through the filter was sampled and the gas was measured for a NO concentration according to a chemiluminescence method. The NO concentration was 30 ppm or less. It was found that the filer adsorbed the NO gas.

A mixed gas of 100 ppm NO and 10% $O_2$ was flown together with 300 ppm of propane (reducing agent) at a flow rate of 10 liters/minute from the outside of the filter. At this time, an electric heater was installed at the inside surface of the filter and the temperature of the filter was maintained at 600° C. A gas which had been passed through the filter was sampled and the gas was measured for a NO concentration according to a chemiluminescence method. The NO concentration was 1 ppm or less.

Further, an exhaust gas from a diesel engine was passed through the above filter for 30 minutes at a flow rate of 15 liters/minute. 96% of dark smoke particulate matter (PM) in the exhaust gas was collected. The PM was oxidized and removed by heating the filter which collected the PM in an atmospheric air at 1,000° C. for 30 minutes, thereby recycling the filter. The recycled filter had no damage.

Example 4

Figure 4:
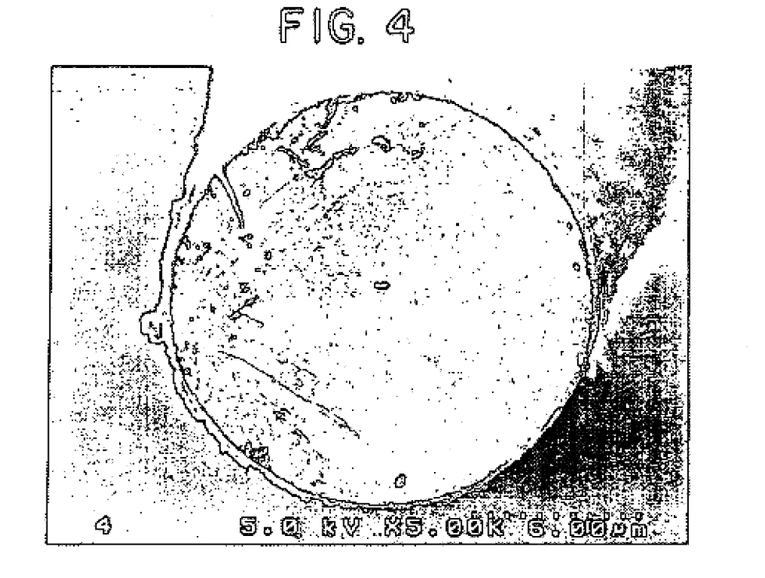
FIG. 4 is a cross-sectional photograph of the whole of a catalyst-carrying type zirconia-containing inorganic fiber obtained in Example 4.
Figure 5:
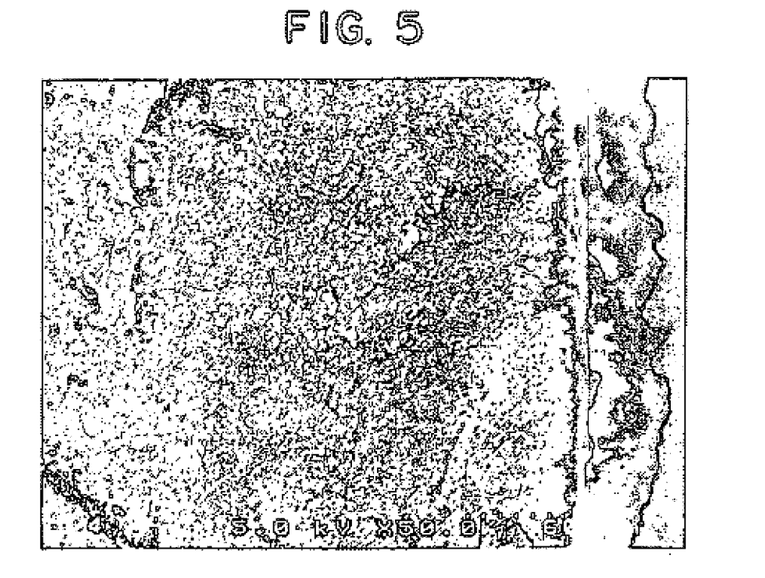
FIG. 5 is a cross-sectional photograph showing a catalyst-support state in a portion near the surface-layer of a catalyst-carrying type zirconia-containing inorganic fiber obtained in Example 4.

A potassium salt-cobalt oxide catalyst as a PM removal catalyst was carried on the surface of the same filter as that produced in Example 3, in the same manner as in Example 2. An exhaust gas from a diesel engine was passed through the above filter, which was kept at 700° C., for 30 minutes at a flow rate of 15 liters/minute. At least 99% of dark smoke particulate matter (PM) in the exhaust gas was removed. The filter after the test was observed through an electron microscope to find no deterioration such as corrosion. FIG. 4 shows a cross-sectional photograph of the whole of the fiber through an electron microscope and FIG. 5 is a cross-sectional photograph showing a catalyst-carrying state in a portion near the surface layer of the fiber.

Example 5

Figure 8:
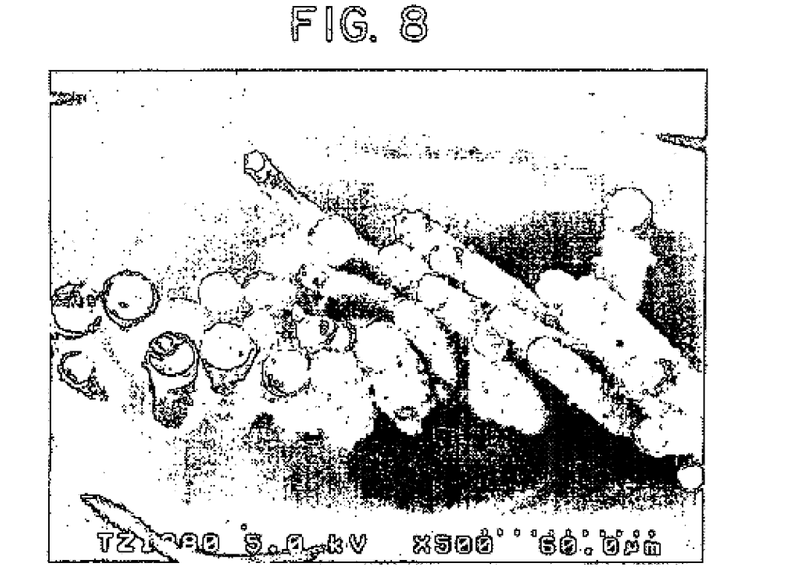
FIG. 8 is a cross-sectional photograph of a zirconia-containing inorganic fiber after an endurance test carried out in Example 5.
Figure 9:
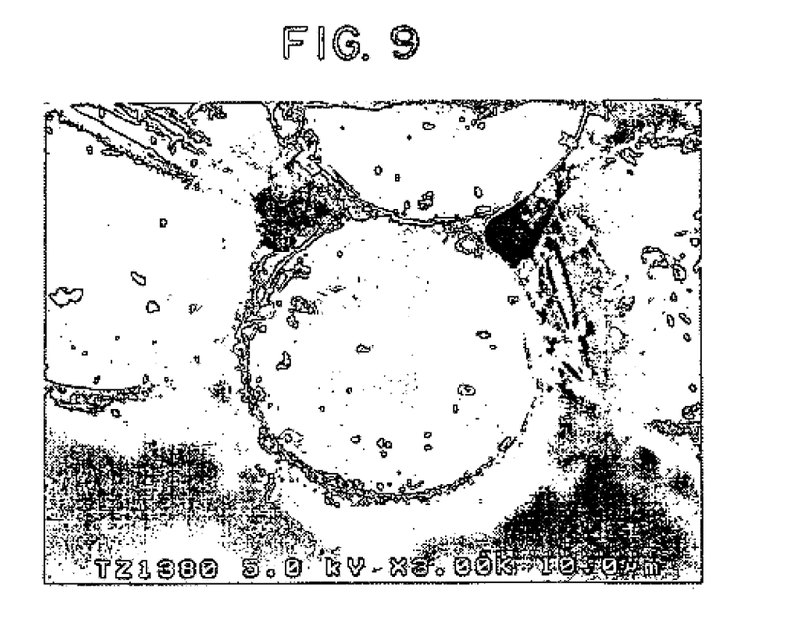
FIG. 9 is a photograph showing the state of appearance of a zirconia-containing inorganic fiber after an endurance test carried out in Example 5.

The same filter having a potassium salt-cobalt oxide catalyst carried thereon as that obtained in Example 4 was heat-treated in air at 800° C. for 100 hours for checking the endurance of the filter. A fiber was taken out from the filter after the endurance test and observed through an electron microscope. By the observation, no deterioration was found in the fiber. FIG. 8 shows a cross-sectional photograph of the zirconia-containing inorganic fiber after the endurance test, and FIG. 9 is an electron micrograph showing the state of appearance of the fiber after the endurance test.

Comparative Example 1

A zirconia sol was prepared by using zirconium tetra-propoxide as a main raw material according to the method described in New Ceramic No.8, pages 53 to 58 (1996). The zirconia sol was spun and then calcined in air at 1,000° C. for 1 hour, to obtain a zirconia fiber. The fiber (average diameter 13 μm) was analyzed by X-ray. It was found that the fiber was formed of zirconia alone. The fiber had a tensile strength of 0.7 GPa and had a specific surface area of 5 m²/g. For carrying out the same NOx removal test and PM removal test as those carried out in Examples 1 to 4, an attempt to mold the fiber into a felt form with a needle-punch was carried out. However, the fiber was fragile so that it was impossible to mold the fiber into a felt form.

Comparative Example 2

A cylindrical filter having a diameter of 200 mm and a height of 500 mm was prepared by using a felt of a commercially-available silicon-carbide-based fiber. A mixed gas of 100 ppm NO and 10% $O_2$ was flown together with 300 ppm of propane (reducing agent) at a flow rate of 10 liters/minute from the outside of the filter. At this time, an electric heater was installed at the inside surface of the filter and the temperature of the filter was maintained at 600° C. A gas which had been passed through the filter was sampled and the gas was measured for a NO concentration according to a chemiluminescence method. The NO concentration was 100 ppm or less. No decrease of NO was found.

Further, an exhaust gas from a diesel engine was passed through the above filter for 30 minutes at a flow rate of 15 liters/minute. 95% of dark smoke particulate matter (PM) in the exhaust gas was collected. The PM was oxidized and removed by heating the filter which collected the PM in an atmospheric air at 1,000° C. for 30 minutes, thereby recycling the filter. The recycled filter was checked, and corrosion and oxidation due to alkali metals or alkali earth metal compounds contained in the exhaust gas were found in the fiber.

Comparative Example 3

Figure 6:
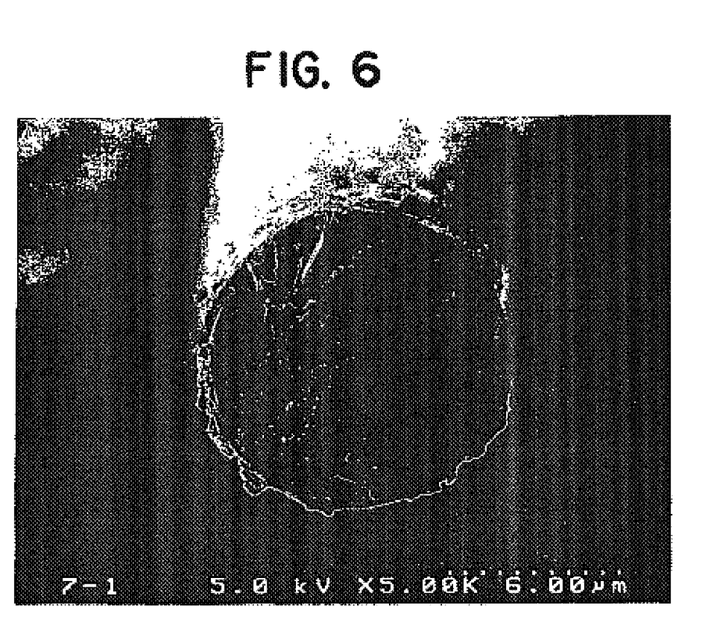
FIG. 6 is across-sectional photograph of the whole of a catalyst-carrying type silicon-carbide-based fiber obtained in Comparative Example 3.
Figure 7:
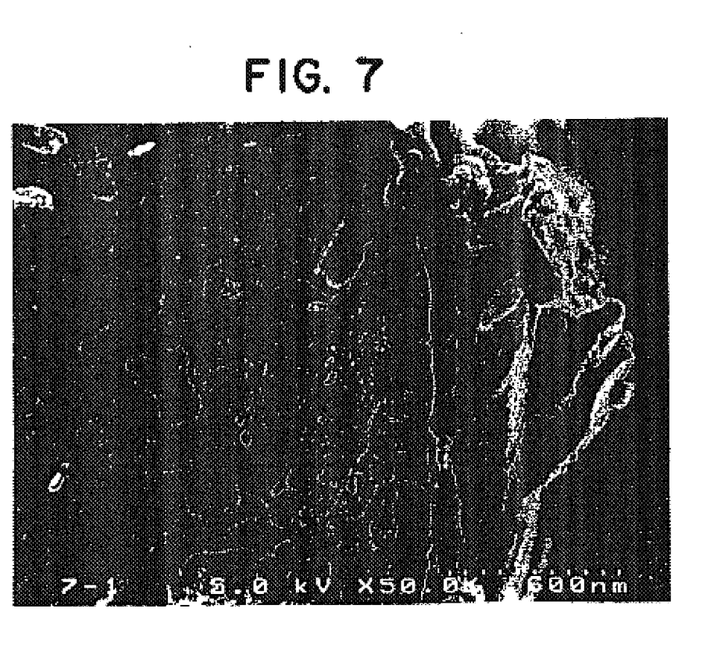
FIG. 7 is a cross-sectional photograph showing a catalyst-carrying state in a portion near the surface-layer of a catalyst-carrying type silicon-carbide-based fiber obtained in Comparative Example 3.

A potassium salt-cobalt oxide catalyst as a PM removal catalyst was carried on the surface of the same silicon-carbide-based fiber filter as that produced in Comparative Example 2, in the same manner as in Example 2. An exhaust gas from a diesel engine was passed through the above filter, which was kept at 700° C., for 30 minutes at a flow rate of 15 liters/minute. At least 98% of dark smoke particulate matter (PM) in the exhaust gas was removed. However, when the filter after the test was observed, it was found that the fiber was extremely corroded by the potassium salt of the catalyst component. FIG. 6 shows a cross-sectional photograph of the whole of the fiber by an electron microscope and FIG. 7 is a cross-sectional photograph showing a catalyst-carrying state in a portion near the surface layer of the fiber by an electron microscope.

Comparative Example 4

Figure 10:
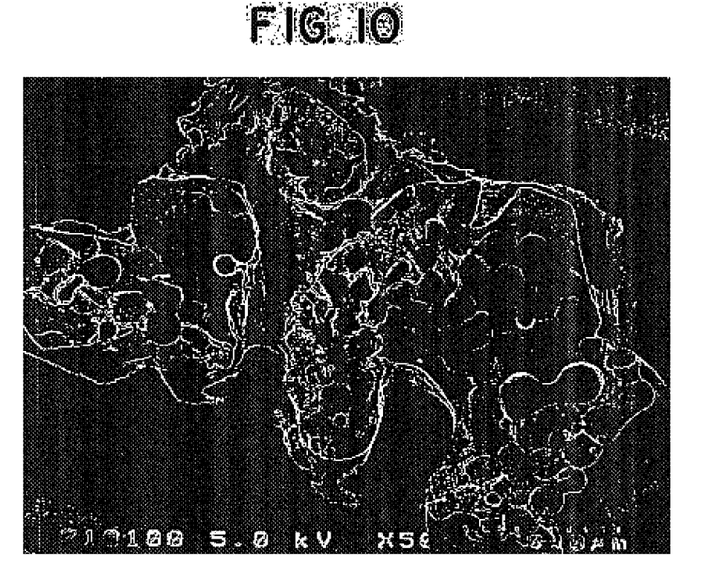
FIG. 10 is a cross-sectional photograph of a silicon-carbide-based fiber after an endurance test carried out in Comparative Example 4.
Figure 11:
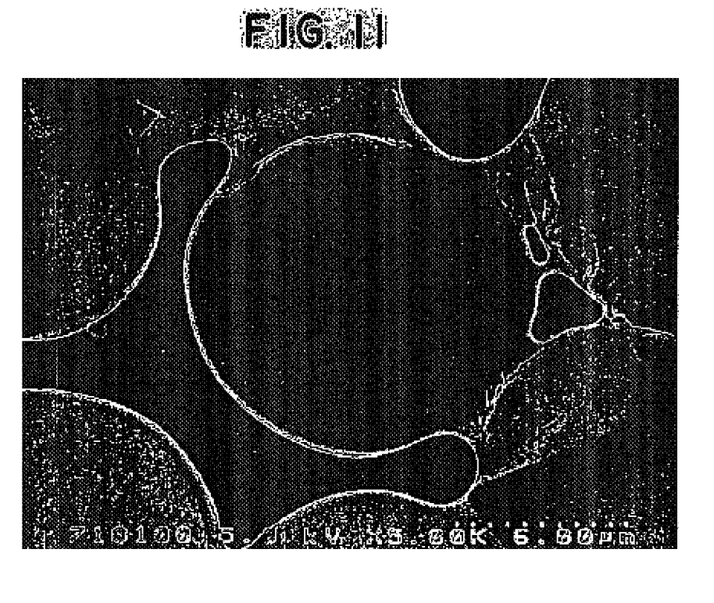
FIG. 11 is a photograph showing the state of appearance of a silicon-carbide-based fiber after an endurance test carried out in Comparative Example 4.

The same filter having a potassium salt-cobalt oxide catalyst carried thereon as that obtained in Comparative Example 3 was heat-treated in air at 800° C. for 100 hours for checking the endurance of the filter. A fiber was taken out from the filter after the endurance test and observed through an electron microscope. By the observation, it was found that the fiber extremely deteriorated to such an extent that the fiber did not retain the initial fiber form. FIG. 10 shows a cross-sectional photograph of the silicon-carbide-based fiber after the endurance test, and FIG. 11 is a photograph showing the state of appearance of the fiber after the endurance test.

INDUSTRIAL USABILITY

According to the present invention, there are provided a high-strength zirconia-containing inorganic fiber having excellent alkali resistance, oxidation resistance, catalyst function and/or catalyst-carrying function and a process for the production thereof. That is, according to the present invention, there are provided a zirconia-containing inorganic fiber which is composed of a central portion (silica phase or silicon carbide phase) taking charge of dynamic properties and a zirconia phase taking charge of various functions in a surface layer and near the surface layer and has a fiber structure having a slope constitution toward the surface layer, and a process for the production thereof.

What is claimed:

1. A zirconia-containing inorganic fiber having a BET specific surface area of at least 1 m²/g which is formed of a composite oxide phase composed of a first phase mainly formed of a silicon carbide and a second phase formed of zirconia, wherein the amount of zirconia slopingly increases toward a surface layer of the fiber.

2. The zirconia-containing inorganic fiber according to claim 1, wherein the amount of the first phase based on th fiber as a whole is 98 to 40% by weight and the ratio of zirconia is 2 to 60% by weight.

3. The zirconia-containing inorganic fiber according to claim 1, wherein a catalyst is carried on the surface of the zirconia-containing inorganic fiber.

4. A method of using the zirconia-containing inorganic fiber recited in claim 1, which comprises utilizing said fiber in woven fabric form or a nonwoven fabric form as a catalyst carrier.

5. A process for the production of the zirconia-containing inorganic fiber recited in claim 1, which process comprises melt-spinning a modified polycarbosilane obtainable by modifying a polycarbosilane which has a main chain structure represented by the formula, (in which R is a hydrogen atom, a lower alkyl group or a phenyl group) and a number average molecular weight of 200 to 10,000, with an organic zirconium compound having a basic structure of the formula Zr(OR')n or the formula ZrR"m (in which R' is an alkyl group having 1 to 20 carbon atoms or a phenyl group, R" is acetylacetonate, and each of m and n is an integer of more than 1), or melt-spinning a mixture of the modified polycarbosilane and an organic zirconium compound, to obtain a spun fiber,     infusibilizing the spun fiber to obtain an infusible fiber, and then,     calcining the infusible fiber in an an inert atmosphere.

6. The process according to claim 5, wherein the modified polycarbosilane is obtained by reacting the organic zirconium compound with the polycarbosilane in an inert atmosphere at 280° C. or less.

7. The process according to claim 5, wherein the organic zirconium compound in the mixture is an organic zirconium compound which is unreacted with the polycarbosilane or an organic zirconium compound which is dimer and/or trimer.

8. The process according to claim 5, wherein a zirconia-containing inorganic fiber comprising a first phase mainly formed of silicon carbide is obtained by calcining the infusible fiber in an inert atmosphere at a temperature in the range of from 500 to 2,000 C. after infusibilizing.

\* \* \* \* \*